(12) United States Patent
Chiruvolu et al.

(10) Patent No.: US 7,613,184 B2
(45) Date of Patent: Nov. 3, 2009

(54) METHOD AND APPARATUS FOR PERFORMING SCALABLE SELECTIVE BACKPRESSURE IN PACKET-SWITCHED NETWORKS USING INTERNAL TAGS

(75) Inventors: Girish Chiruvolu, Plano, TX (US); An Ge, Plano, TX (US)

(73) Assignee: Alcatel Lucent, Paris (FR)

( * ) Notice: Subject to any disclaimer, the term of this patent is extended or adjusted under 35 U.S.C. 154(b) by 884 days.

(21) Appl. No.: 10/704,097

(22) Filed: Nov. 7, 2003

(65) Prior Publication Data

US 2005/0100011 A1    May 12, 2005

(51) Int. Cl.
*H04L 12/56* (2006.01)
*G06F 11/00* (2006.01)
(52) U.S. Cl. .................. 370/392; 370/235; 370/412; 370/419
(58) Field of Classification Search ......... 370/229–239, 370/412–419, 389–394
See application file for complete search history.

(56) References Cited

U.S. PATENT DOCUMENTS

| | | | |
|---|---|---|---|
| 5,812,527 A | | 9/1998 | Kline et al. |
| 5,859,846 A * | | 1/1999 | Kim et al. .............. 370/395.62 |
| 6,636,510 B1 * | | 10/2003 | Lee et al. .................... 370/390 |
| 6,937,607 B2 * | | 8/2005 | van Hoof .................... 370/414 |
| 6,996,102 B2 * | | 2/2006 | Pegrum et al. .............. 370/390 |
| 7,035,212 B1 * | | 4/2006 | Mittal et al. ................ 370/230 |
| 7,050,430 B2 * | | 5/2006 | Kalkunte et al. ............ 370/389 |
| 7,145,904 B2 * | | 12/2006 | Zhao et al. .................... 370/371 |
| 7,212,534 B2 * | | 5/2007 | Kadambi et .............. 370/395.2 |
| 7,483,432 B2 * | | 1/2009 | Nuss et al. ................ 370/395.3 |
| 7,502,314 B2 * | | 3/2009 | Shimizu ..................... 370/227 |
| 2002/0012585 A1 * | | 1/2002 | Kalkunte et al. ............ 415/137 |
| 2003/0128703 A1 | | 7/2003 | Zhao et al. |

OTHER PUBLICATIONS

Downey, T., "Overview of Tag Switching" Professional Program Proceedings Electronics Industries Forum of New England, 1997. May 1997. pp. 61-66.*
Rekhter, Y. et al., "Tag Switching Architecture Overview" Proceedings of the IEEE. Dec. 1997. Vol. 85, No. 12. pp. 1973-1983.*
W. Noureddine and F. Tobagi; "Selective Back-Pressure in Switched Ethernet LANs"; Global Telecommunications Conference, 1999, Globecom '99, vol. 2, 1999; pp. 1256-1256.

* cited by examiner

*Primary Examiner*—Tri H Phan
(74) *Attorney, Agent, or Firm*—Garlick, Harrison & Markison, LLP

(57) ABSTRACT

A packet switch is described. In one embodiment, the packet switch comprises a plurality of ingress ports for receiving packets at the packet switch and for appending a tag to each packet that designates one of the plurality of ingress ports that received the packet; a plurality of egress ports for removing the tag from the packets and transmitting the packets from the packet switch; and switch fabric for switching the packets from one of the plurality of ingress ports to one of the plurality of egress ports.

23 Claims, 3 Drawing Sheets

METHOD AND APPARATUS FOR PERFORMING SCALABLE SELECTIVE BACKPRESSURE IN PACKET-SWITCHED NETWORKS USING INTERNAL TAGS

BACKGROUND OF THE INVENTION

1. Technical Field of the Invention

The present invention generally relates to packet-switched networks. More particularly, and not by way of any limitation, the present invention is directed to method and apparatus for scalable selective backpressure and traffic monitoring and shaping in such networks.

2. Description of Related Art

Currently in Ethernet switches, there exists no scalable mechanism for identifying the ingress port of a switch, such as a switched Ethernet MAN, for example, from which a packet or frame arrives at a given egress port. On the contrary, the only manner in which the ingress port can be identified is by determining the source media access control ("MAC") address of the ingress port; however, determining this address is complex and time-consuming, requiring the performance of a significant number of data look-ups. Moreover, this scheme is not scalable.

There are many situations in which knowledge of the identity of the ingress port at which a packet originated would be useful. For example, the information could be used to identify aggressive traffic aggregates, thereby facilitating the provision of fairness per input port. The information could also be used in implementing schemes for improving fairness within intra-aggregates at egress ports; accordingly, enhancements such as selective backpressure can be incorporated within the switch, in contrast to current IEEE 802.3x. The information could be used to facilitate selective egress shaping and facilitates the collection of input/output port traffic distribution statistics.

Preferably, a mechanism used to determine the ingress port of each packet that arrives at a given egress port would be implemented such that there would be no need for standardization; that is, the mechanism would be confined to a given switch. Moreover, such a mechanism should be scalable and applicable to multicast traffic.

SUMMARY OF THE INVENTION

One embodiment is a packet switch comprising a plurality of ingress ports for receiving packets at the packet switch and for appending a tag to each packet that designates one of the plurality of ingress ports that received the packet; a plurality of egress ports for removing the tag from each packet and transmitting the packets from the packet switch; and switch fabric for switching the packets from one of the plurality of ingress ports to one of the plurality of egress ports.

Another embodiment is a packet switch comprising a plurality of ingress ports for receiving packets and for appending a tag to each packet that designates one of the plurality of ingress ports that received the packet; a plurality of egress ports for removing the tag from each packet and transmitting the packets from the packet switch; switch fabric for switching the packets from one of the plurality of ingress ports to one of the plurality of egress ports; and a queue management system for, responsive to congestion in a queue of an egress port, examining tags of the packets in the queue to identify which ingress port contributes the most number of packets in the queue, and taking steps to alleviate the congestion.

Another embodiment is a packet switch comprising means for appending to each packet received at the packet switch a tag identifying one of a plurality of ingress ports that received the packet; means for removing the tag from each packet and transmitting the packets from the packet switch via one of a plurality of egress ports; and means for switching each packet from one of the plurality of ingress ports to one of the plurality of egress ports.

Another embodiment is a packet switching method comprising appending to each packet received at the packet switch a tag identifying one of a plurality of ingress ports that received the packet; switching each packet from one of the plurality of ingress ports to one of a plurality of egress ports; at each egress port, removing from each packet the tag; and subsequent to the removing, transmitting each packet from the packet switch via one of the plurality of egress ports.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
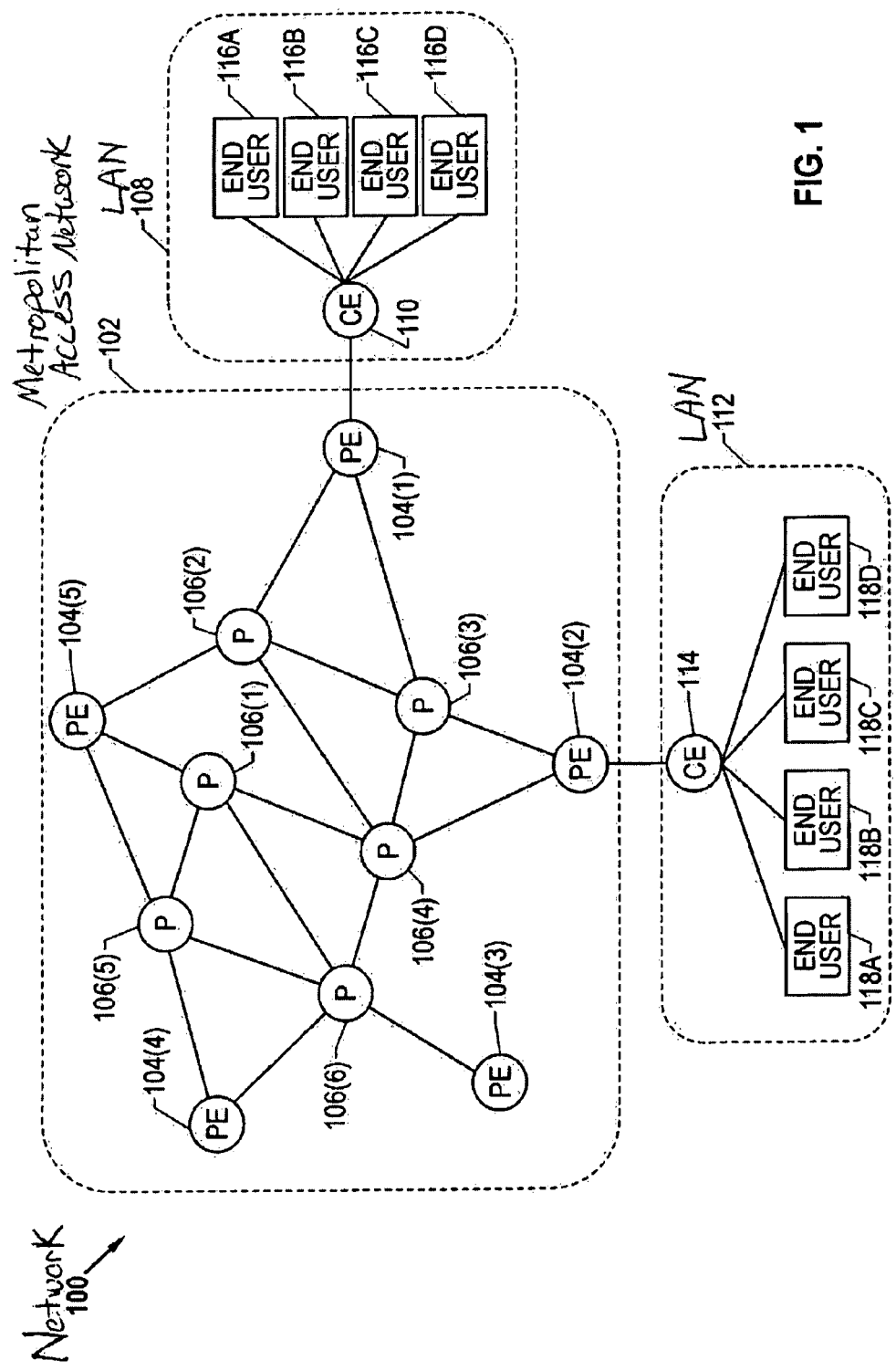
FIG. 1 is a block diagram of an Ethernet-switched network 100.

In the drawings, like or similar elements are designated with identical reference numerals throughout the several views thereof, and the various elements depicted are not necessarily drawn to scale. It will be appreciated that the inventive concepts described herein are applicable to any VPLS network; however, representative values for delay, etc., have been selected to illustrate those concepts.

FIG. 1 is a block diagram of an Ethernet-switched network 100. The network 100 includes a MAN 102 comprising a plurality of nodes represented in FIG. 1 by nodes 104(1)-104(5), 106(1)-106(6). Each of the nodes 104(1)-104(5), 106(1)-106(6) comprises a router or switch. The nodes 104(1)-104(5) comprise provider edge ("PE") nodes located on the edge of the MAN 102 for permitting traffic ingress into and egress from the MAN from and to other networks. For example, as shown in FIG. 1, a first local area network ("LAN") 108 is connected to the MAN 102 via a link between a client edge ("CE") node 110 of the LAN and the PE node 104(1). Similarly, a second LAN 112 is connected to the MAN 102 via a link between a CE node 114 of the LAN and the PE node 104(2). Each LAN 108, 112, comprises a plurality of user devices, represented in FIG. 1 by devices 116(A)-116(D), 118(A)-118(D), which can transmit data to and receive data from other devices connected to the MAN 102 via the corresponding CE node 110, 114.

One embodiment is a methodology that inserts into each packet, or frame, at the ingress port of a packet switch an "internal tag" so that at an aggregation point (e.g., an egress port), the tag can be used to identify the ingress port from which the frame arrived. In addition to facilitating identification of the ingress port of a packet, the tag can facilitate implementation of schemes for fair bandwidth allocation, traffic shaping (using the tag as a discriminator at the egress ports), and accumulation of statistics of the distribution of traffic according to ingress/egress port pairs.

Figure 2:
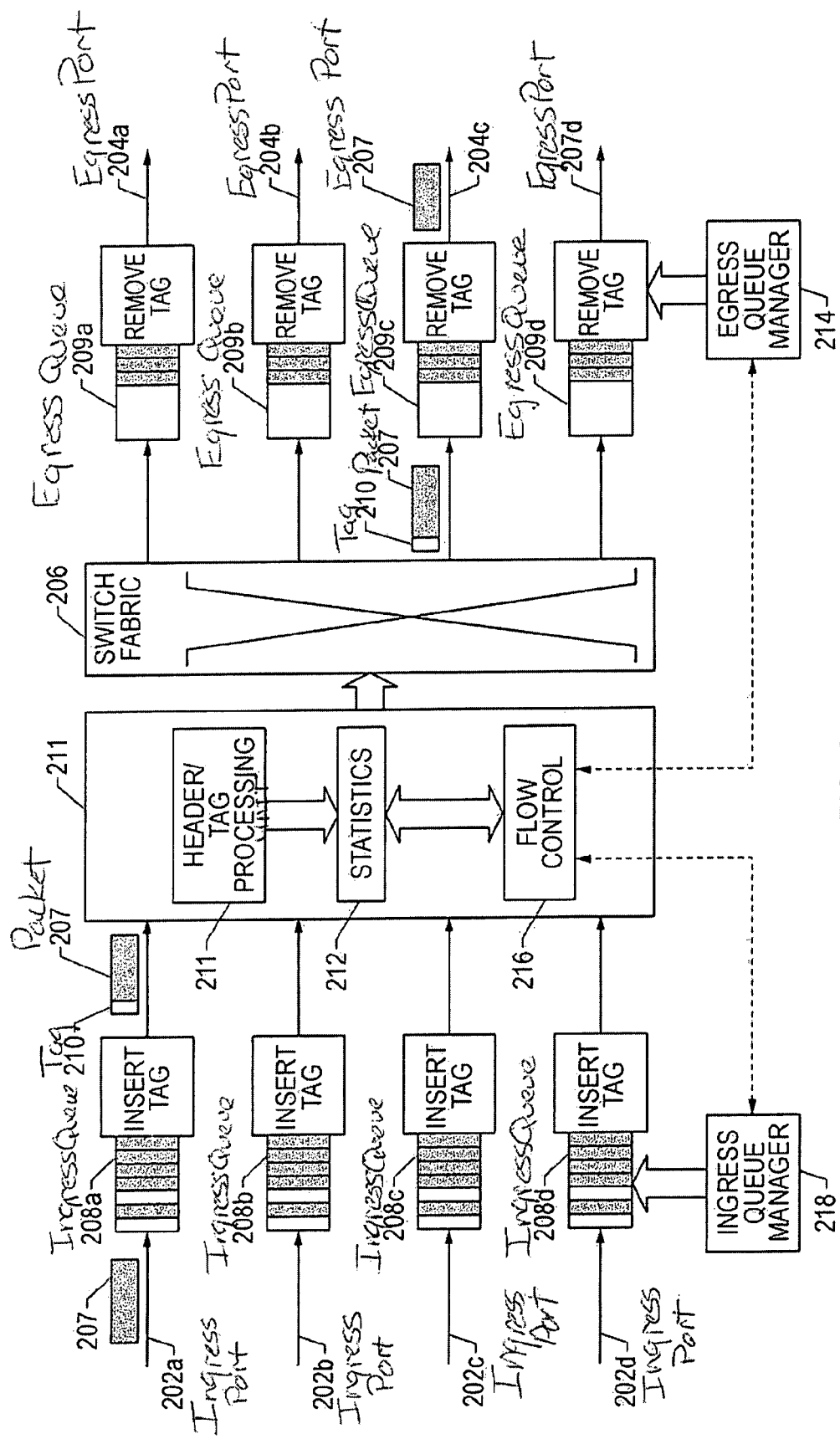
FIG. 2 is a schematic block diagram of a switch node in accordance with one embodiment.

FIG. 2 is a block diagram of a switch node 200 in accordance with one embodiment. The switch node 200 selectively enables connection of each of plurality of ingress ports, illustrated in FIG. 2 by ingress ports 202a-202d, to any one of a plurality of egress ports, represented in FIG. 2 by egress ports 204a-204d, via switch fabric 206. It will be recognized that each of the ports 202a-202d, 204a-204d, is connected to a link, the other end of which is connected to a remote node (not shown). Upon receipt at one of the ingress ports, e.g., the ingress port 202a-202d, each packet, represented in FIG. 2 by a packet 207, is throughput a corresponding ingress queue 208a-208d. Similarly, before being output from the node 200 via one of the egress ports 204a-204d, packets are throughput a corresponding egress queue 209a-209d.

In accordance with one embodiment, a unique tag 210 is added to the packet 207 to identify through which of the ingress ports 202a-202d the packet arrived at the switch node 200. In the illustrated example, the packet 207 arrived through the ingress port 208a. A header/tag processing unit 211 receives and processes the tag 210, realizing various functionalities such as rate measurement, Priority/Class of Service, fair bandwidth calculations (based on ingress port, for example), and others, as well as source/destination information contained in the packet 207, and provides the data to a statistics unit 212 of the node 200. The collected statistics data are further processed to determine the flow control that may include fair bandwidth sharing/selective frame-drop. Switch fabric 206 delivers the packet 207 to the appropriate egress port, which in the illustrated example is the egress port 204c, via the corresponding egress queue 204c. Before the packet 207 is sent out from the switch node 200, the tag 210 is removed therefrom. As a result, the tag 210 only has meaning internally to the node 200.

When an egress link, such as the link connected to the egress port 204c, begins to experience congestion, the corresponding egress queue 209c begins to fill and then back-up. At this point, an egress queue manager 214 of a queue management system, which also comprises a flow control unit 216 and an ingress queue manager 218, examine the tags of packets in the queue 209c and determine which ingress port has contributed the highest number of packets in the queue. At that point, backpressure can be selectively applied to the corresponding ingress port via the flow control unit 216 and the ingress queue manager 218.

Figure 3:
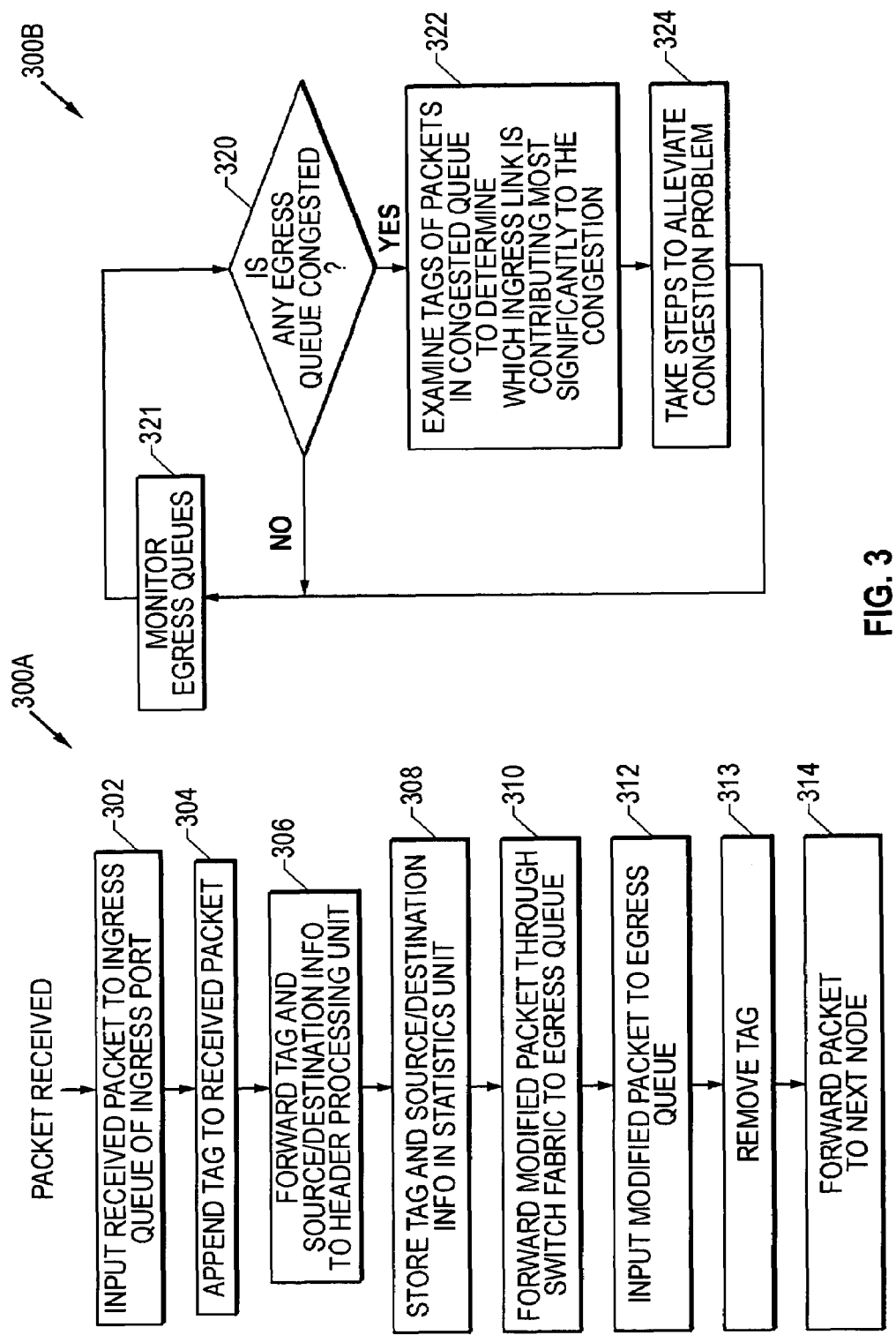
FIG. 3 is a flowchart of the operation of one embodiment of the switch node of FIG. 2.

FIG. 3 illustrate flowcharts, respectively designated by reference numerals 300A and 300B, illustrating operation of one embodiment of a switch node, such as the switch node 200 (FIG. 2). Referring first to the flowchart 300A, responsive to arrival of a packet at an ingress port of the switch node, in step 302, the received packet is input to the ingress queue corresponding to the ingress port at which it arrived. In step 304, a tag identifying the ingress port at which the packet arrived is appended to the packet to create a modified packet. In addition, in step 306, the tag and source/destination information contained in the header of the modified packet are forwarded to the header/tag processing unit. In one embodiment, the tag comprises three fields, one of which contains a number identifying the ingress port of the packet, a second of which specifies the traffic rate at the ingress port, and the last of which indicates the type of traffic (i.e., into the switch from the end-user side or from the network). It will be recognized, however, that the tag may include more or fewer fields as deemed necessary for the particular function and/or network. In step 308, the header/tag processing unit stores the information in the statistics unit.

In step 310, the modified packet enters the switch fabric and is forwarded to the egress queue of the egress port through which it is to exit the switch node. It will be recognized that the tag of the modified packet is ignored by the switch fabric; the modified packet is switched through the fabric in a conventional manner. In step 312, the modified packet is input to the egress queue corresponding to the egress port through which it will be transmitted to the next node in its path through the network. While the modified packet is in the queue, its tag, and hence the ingress port through which it entered the switch node, can be determined by the egress queue manager for purposes that will be described hereinbelow.

In step 313, before the modified packet exits the switch node, the tag is removed therefrom. In step 314, the packet is forwarded, in its original form, to the next node.

The flowchart 300B illustrates operations of the switch node that are performed concurrently with those illustrated in the flowchart 300A. In particular, in step 320, the egress queue manager continuously monitor the length of each of the egress queues to determine whether any of the queues are backing up, thereby indicating possible congestion on the corresponding link. Responsive to a determination that none of the egress queues are congested, execution proceeds to step 231, in which the egress queue manager continues to monitor the egress queues, and then returns to step 320. Otherwise, execution proceeds to step 322, in which the egress queue manager examines the tags of the packets in the congested egress queue to determine which of the ingress ports, and hence ingress links, is contributing the highest number of packets to the congested queue. In step 324, one of a number of measures may be taken to alleviate the congestion. For example, the flow monitor may selectively apply backpressure to the corresponding ingress port via the ingress queue manager. Execution then returns to step 321.

As a result, the embodiments described herein enable aggressive aggregates to be throttled down and fairness realized. Without tags, it would be difficult, if not impossible, to apply selective backpressure to the appropriate ingress port.

As previously indicated, scope of the tag is between ingress and egress ports; there is no need to identify individual source/destination address. As a result, the embodiment is scalable.

The embodiments described herein are beneficial because no standardization is needed, as the scheme is confined to a single switch. Moreover, the embodiments can be used to identify aggressive traffic aggregates, thereby facilitating provision of fairness per input port. In addition, schemes for improving fairness within intra-aggregates at egress ports can easily be incorporated into the embodiments, thus enhancements such as selective backpressure can be incorporated within the switch, in contrast to current IEEE 802.3x. The embodiments facilitate selective egress shaping and the collection of input/output port traffic distribution statistics. The methodology is scalable, as no source MAC address-based lookups are necessary. The foregoing features are also applicable to multicast traffic.

It is believed that the operation and construction of the present invention will be apparent from the Detailed Description set forth above. While the exemplary embodiments of the invention shown and described have been characterized as being preferred, it should be readily understood that various changes and modifications could be made therein without departing from the scope of the present invention as set forth in the following claims.

What is claimed is:

1. A packet switch comprising:
   a plurality of ingress ports for receiving packets and for appending a tag to each packet that designates one of the plurality of ingress ports that received the packet;
   a plurality of egress ports for removing the tag from each packet and transmitting the packets from the packet switch; and a switch fabric for switching the packets from one of the plurality of ingress ports to one of the plurality of egress ports.

2. The packet switch of claim 1 further comprising:
a queue management system for determining congestion in a queue of an egress port, examining tags of the packets in the queue to identify which ingress port contributes the most number of packets in the queue, and selectively applying backpressure techniques to the identified ingress port.

3. The packet switch of claim 2 wherein the queue management system comprises:
an egress queue manager for monitoring egress port queues;
an ingress queue manager for monitoring ingress port queues; and
a flow control unit for controlling a rate of flow of packets into the ingress port queues.

4. The packet switch of claim 1 further comprising:
a header/tag processing unit for processing for each received packet the tag of the packet and source and destination information contained in the packet.

5. The packet switch of claim 4 further comprising:
a statistics unit for receiving from the header/tag processing unit the tag and source and destination information processed from each packet and for storing the information.

6. A packet switch comprising:
a plurality of ingress ports for receiving packets and for appending a tag to each packet that designates one of the plurality of ingress ports that received the packet;
a plurality of egress ports for removing the tag from each packet and transmitting the packets from the packet switch;
switch fabric for switching the packets from one of the plurality of ingress ports to one of the plurality of egress ports; and
a queue management system, operating responsive to congestion in a queue of an egress port, for examining tags of the packets in the queue to identify which ingress port contributes the most number of packets in the queue, and taking steps to alleviate the congestion.

7. The packet switch of claim 6 wherein the taking steps to alleviate the congestion comprises selectively applying backpressure techniques to the identified ingress port.

8. The packet switch of claim 6 wherein the queue management system comprises:
an egress queue manager for monitoring egress port queues;
an ingress queue manager for monitoring ingress port queues; and
a flow control unit for controlling a rate of flow of packets into the ingress port queues.

9. The packet switch of claim 6 further comprising:
a header/tag processing unit for processing for each received packet the tag of the packet and source and destination information contained in the packet.

10. The packet switch of claim 9 further comprising:
a statistics unit for receiving from the header/tag processing unit the tag and source and destination information processed from each packet.

11. A packet switch comprising:
means for appending to each packet received at the packet switch a tag identifying one of a plurality of ingress ports that received the packet;
means for removing the tag from each packet and transmitting the packets from the packet switch via one of a plurality of egress ports; and
means for switching each packet from one of the plurality of ingress ports to one of the plurality of egress ports.

12. The packet switch of claim 11 further comprising:
means for determining congestion in a queue of an egress port;
means for examining tags of the packets in the queue to identify which ingress port contributes the most number of packets in the queue; and
means for selectively applying backpressure techniques to the identified ingress port.

13. The packet switch of claim 12 wherein the means for determining congestion comprises an egress queue manager for monitoring egress port queues.

14. The packet switch of claim 12 wherein the means for examining tags comprises an egress queue manager for monitoring egress port queues.

15. The packet switch of claim 12 wherein the means for selectively applying backpressure techniques comprises:
an ingress queue manager for monitoring ingress port queues; and
a flow control unit for controlling a rate of flow of packets into the ingress port queues.

16. The packet switch of claim 11 further comprising:
means for processing for each received packet the tag of the packet and source and destination information contained in the packet.

17. The packet switch of claim 16 further comprising:
means for receiving from the means for processing the tag and source and destination information processed from each packet and for storing the information.

18. A packet switching method comprising:
appending to each packet received at the packet switch a tag identifying one of a plurality of ingress ports that received the packet;
switching each packet from one of the plurality of ingress ports to one of a plurality of egress ports;
at each egress port, removing from each packet the tag; and
subsequent to the removing, transmitting each packet from the packet switch via one of the plurality of egress ports.

19. The method of claim 18 further comprising:
determining congestion in a queue of an egress port;
examining tags of the packets in the queue; and
responding to the congestion using information obtained from the examining.

20. The method of claim 19 wherein the examining comprises:
identifying from the tags which ingress port contributes the most number of packets in the queue.

21. The method of claim 20 wherein the responding comprises:
selectively applying backpressure techniques to the identified ingress port.

22. The method of claim 18 further comprising:
for each received packet, processing the tag of the packet and source and destination information contained in the packet.

23. The method of claim 22 further comprising:
for each received packet, storing the processed tag and source and destination information.

* * * * *

UNITED STATES PATENT AND TRADEMARK OFFICE
CERTIFICATE OF CORRECTION

PATENT NO. : 7,613,184 B2
APPLICATION NO. : 10/704097
DATED : November 3, 2009
INVENTOR(S) : Chiruvolu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1165 days.

Signed and Sealed this

Nineteenth Day of October, 2010

David J. Kappos
*Director of the United States Patent and Trademark Office*